US010232506B2

(12) United States Patent
Hashimoto et al.

(10) Patent No.: US 10,232,506 B2
(45) Date of Patent: Mar. 19, 2019

(54) PRODUCTION SYSTEM

(71) Applicant: KAWASAKI JUKOGYO KABUSHIKI KAISHA, Kobe-shi, Hyogo (JP)

(72) Inventors: Yasuhiko Hashimoto, Kobe (JP); Takahiro Inada, Kakogawa (JP); Kenji Bando, Nishinomiya (JP); Yoshiaki Tanaka, Akashi (JP); Junichi Murakami, Kobe (JP); Satoru Hibino, Kobe (JP); Yukio Iwasaki, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 0 days.

(21) Appl. No.: 15/539,721

(22) PCT Filed: Dec. 26, 2014

(86) PCT No.: PCT/JP2014/006495
§ 371 (c)(1),
(2) Date: Jun. 26, 2017

(87) PCT Pub. No.: WO2016/103304
PCT Pub. Date: Jun. 30, 2016

(65) Prior Publication Data
US 2017/0341221 A1 Nov. 30, 2017

(51) Int. Cl.
*B25J 5/00* (2006.01)
*B25J 5/02* (2006.01)
(Continued)

(52) U.S. Cl.
CPC .......... *B25J 5/02* (2013.01); *B25J 5/00* (2013.01); *B25J 9/0093* (2013.01); *B25J 9/0096* (2013.01);
(Continued)

(58) Field of Classification Search
CPC ........................................................ B25J 5/02
(Continued)

(56) References Cited

U.S. PATENT DOCUMENTS 8,120,301 B2 * 2/2012 Goldberg .............. A61B 34/30
318/432
8,620,473 B2 * 12/2013 Diolaiti ................. A61B 90/37
700/245
8,931,682 B2 * 1/2015 Timm .................. A61B 17/072
227/178.1

FOREIGN PATENT DOCUMENTS

DE 102007045143 A1 4/2009
JP S5937075 A 2/1984
(Continued)

OTHER PUBLICATIONS

Mar. 17, 2015 Search Report issued in International Patent Application No. PCT/JP2014/006495.
(Continued)

*Primary Examiner* — David Luo
(74) *Attorney, Agent, or Firm* — Oliff PLC

(57) ABSTRACT

Production system including a rail extending horizontally, and an articulated robot that is self-travelable along the rail parallel to an extending direction of the rail. The robot includes a carriage having at least one operating shaft configured to be driven by a servomotor and to self-travel along the rail, a slider projecting toward the rail from the carriage and configured to releasably engage with the rail, a robotic arm supported by the carriage and having at least one operating shaft driven by a servomotor and constitutes a joint, an end effector provided to a tip-end of the robotic arm, and a control unit inside the carriage configured to control the operating shafts of the robotic arm and the carriage so a control point defined in the robotic arm or the end effector reaches a target position by a collaboration of the operating shafts of the robotic arm and the carriage.

5 Claims, 8 Drawing Sheets

(51) Int. Cl.
  *B25J 9/00* (2006.01)
  *B25J 9/04* (2006.01)
  *B25J 9/06* (2006.01)
  *B25J 9/16* (2006.01)
  *B25J 13/00* (2006.01)

(52) U.S. Cl.
  CPC ............... *B25J 9/04* (2013.01); *B25J 9/06* (2013.01); *B25J 9/1687* (2013.01); *B25J 13/00* (2013.01); *B25J 5/007* (2013.01); *B25J 9/043* (2013.01)

(58) Field of Classification Search
  USPC .............. 318/568.12, 568.11, 568.1, 567
  See application file for complete search history.

(56) References Cited

FOREIGN PATENT DOCUMENTS

| | | |
|---|---|---|
| JP | S61-146690 A | 7/1986 |
| JP | S61-215162 A | 9/1986 |
| JP | S62-079984 A | 4/1987 |
| JP | H01-180102 U | 12/1989 |
| JP | H02-51085 U | 4/1990 |
| JP | H02-160483 A | 6/1990 |
| JP | H05-318181 A | 12/1993 |
| JP | H09-193053 A | 7/1997 |
| JP | H10-034455 A | 2/1998 |
| JP | 2004-265894 A | 9/2004 |
| JP | 2005-246593 A | 9/2005 |
| JP | 2010-064198 A | 3/2010 |
| JP | 2014-144490 A | 8/2014 |
| KR | 2011-0125919 A | 11/2011 |
| KR | 2011-0129631 A | 12/2011 |

OTHER PUBLICATIONS

Jun. 27, 2017 International Preliminary Report on Patentability issued in International Patent Application No. PCT/JP2014/006495.
Nov. 7, 2017 Office Action issued in Japanese Patent Application No. 2016-565604.
May 22, 2018 Office Action issued in Japanese Patent Application No. 2016-565604.
Aug. 31, 2018 extended European Seach Report issued in European Patent Application No. 14908915.3.

* cited by examiner

PRODUCTION SYSTEM

TECHNICAL FIELD

The present invention relates to a production system utilizing a self-traveling articulated robot provided with a carriage and a robotic arm supported by the carriage.

BACKGROUND ART

Conventionally, line production systems of a human-and-robot collaborating type are proposed for assembling processes of electric and/or electronic components, etc., in which workers and work robots stationed serially along a conveyance line of workpieces collaborate. For example, Patent Document 1 discloses a dual-arm work robot used for the human-and-robot collaborating type line production system.

The dual-arm work robot of Patent Document 1 includes a main body, a head, two arms, hands attached to respective tip-ends of the arms, and a carriage which supports a lower part of the main body. When installing the dual-arm work robot in a workbench, an operator moves the carriage supported by freely-rollable driving wheels is manually pushed and moved to the workbench, and is then fixed in position. If the robot moved while working and a correction of the work position is needed, a control device causes the arms to extend and engage anchor pins provided at tip-ends of the arms with anchor points provided to the workbench, switches the carriage to a state where the carriage is supported by the freely-rollable driving wheels, and pulls the extended arms to move the carriage to a desirable work position.

Patent Document 2 discloses a robot system of a cell production type using robots. In this robot system, a robot performs attaching, assembling, machining, inspection, etc. of components instead of worker(s). The robot system of Patent Document 2 is provided with the robot and a workbench. The workbench is provided with a workbench-side fixing member. The robot also includes a main body having a robotic arm, a pedestal part to which the main body is fixed, and steerable driving wheels which enable the pedestal part to move, and a robot-side fixing member which is coupled to the workbench-side fixing member is provided to the pedestal part. By coupling the robot-side fixing member to the workbench-side fixing member, the robot is fixed to the workbench and electric power is supplied to the robot from the workbench.

REFERENCE DOCUMENTS OF CONVENTIONAL ART

Patent Documents

[Patent Document 1] JP2010-064198A
[Patent Document 2] JP2014-144490A

DISCLOSURE OF THE INVENTION

Problems to be Solved by the Invention

In the dual-arm work robot of Patent Document 1, since the arms are used for correcting the work position of the robot, the work position cannot be corrected while the robot is working. Moreover, in the dual-arm work robot of Patent Document 1, since the position of the robot is corrected for the purpose of fixing the work position of the robot, it is not anticipated that the robot moves from the work position while working.

Moreover, in the robot of Patent Document 2, since the robot is fixed to the workbench by coupling the robot-side fixing member to the workbench-side fixing member, the robot cannot work while moving with respect to the workbench.

The present invention is made in view of the above situations, and the purpose thereof is to propose a production system utilizing an articulated robot which is self-travelable, in which the articulated robot is able to work while moving.

SUMMARY OF THE INVENTION

According to one aspect of the present invention, a production system is provided, which includes a rail extending horizontally, and a self-traveling articulated robot that is self-travelable along the rail in parallel to an extending direction of the rail. The self-traveling articulated robot includes a carriage having at least one operating shaft configured to be driven by a servomotor and to self-travel along the rail, a slider projecting toward the rail from the carriage and configured to releasably engage with the rail, a robotic arm supported by the carriage and having at least one operating shaft that is driven by a servomotor and constitutes a joint, an end effector provided to a tip-end of the robotic arm, and a control unit provided inside the carriage and configured to control the operating shaft of the robotic arm and the operating shaft of the carriage so that a control point defined in the robotic arm or the end effector reaches a target position by a collaboration of the operating shaft of the robotic arm and the operating shaft of the carriage.

In the production system, the robotic arm is workable, while moving the carriage which is a pedestal of the robotic arm.

EFFECT OF THE INVENTION

According to the present invention, the production system utilizing the articulated robot which is self-travelable, in which the articulated robot is able to work while moving, is achieved.

MODES FOR CARRYING OUT THE INVENTION

Next, embodiments of the present invention are described with reference to the accompanying drawings. A production system according to the present invention is, for example, a system for producing products or components by means of a line production or a cell production, and is provided with a rail and at least one or more self-traveling articulated robots which is self-travelable along the rail. This self-traveling articulated robot performs at least one of works, such as transferring, assembling component(s) to, rearranging, converting the posture of, a workpiece, which are conventionally performed by worker(s). Below, Embodiments 1 and 2 of the production system according to the present invention will be described, respectively.

Embodiment 1

Figure 1:
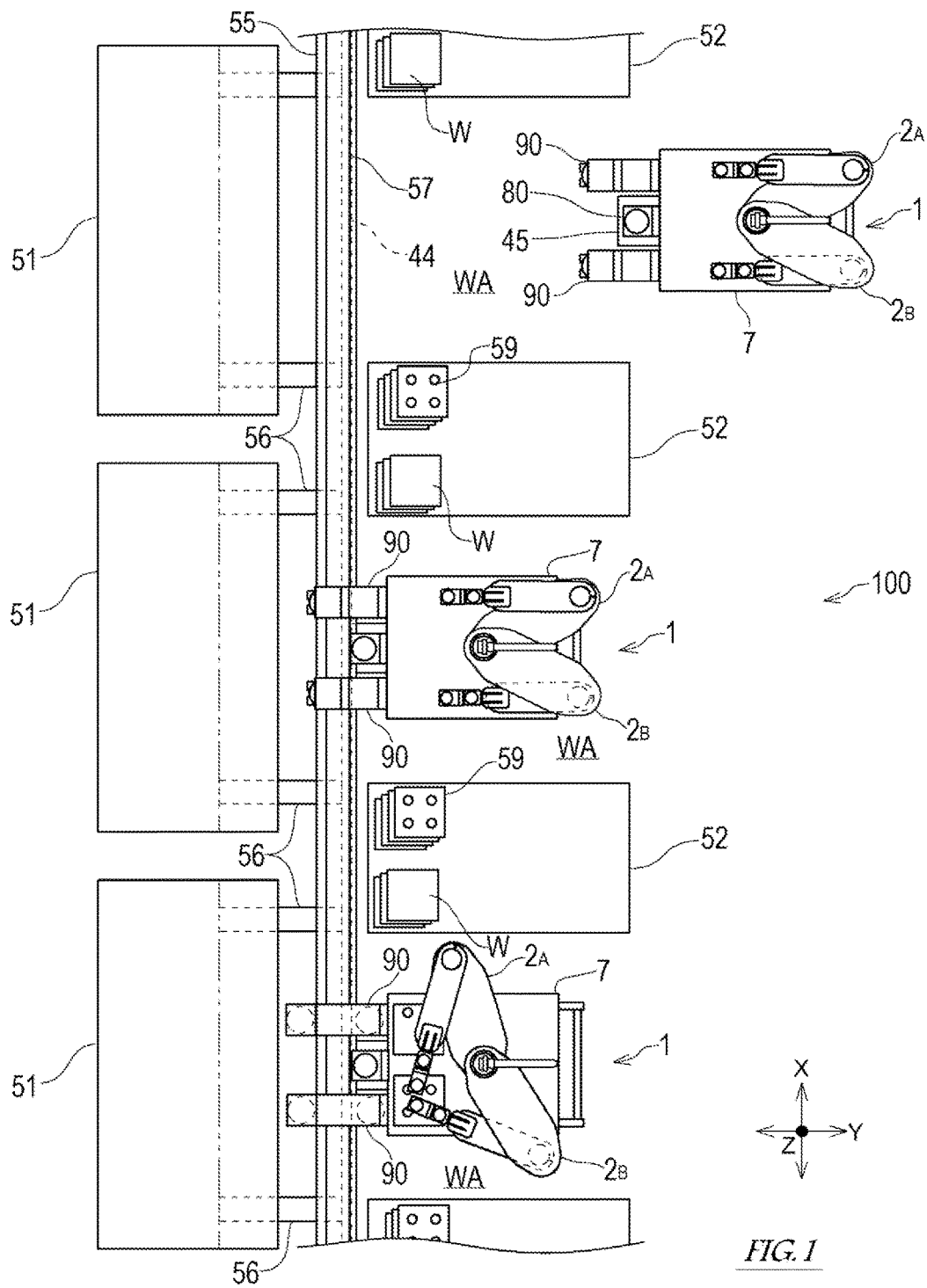
FIG. 1 is a plan view of a production system according to Embodiment 1 of the present invention.
Figure 2:
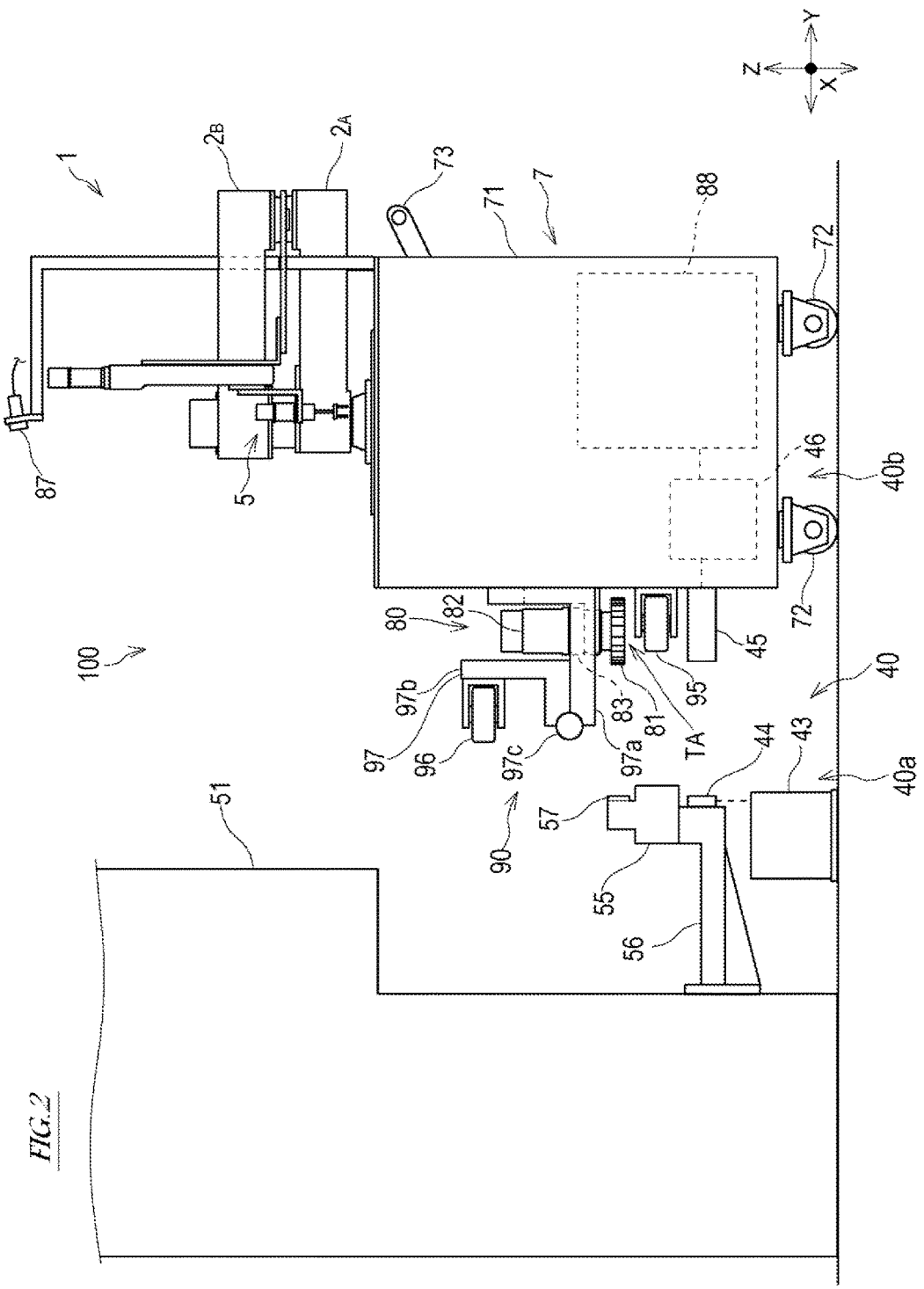
FIG. 2 is a side view schematically illustrating a structure of a rail and self-traveling articulated robots of the production system illustrated in FIG. 1.
Figure 3:
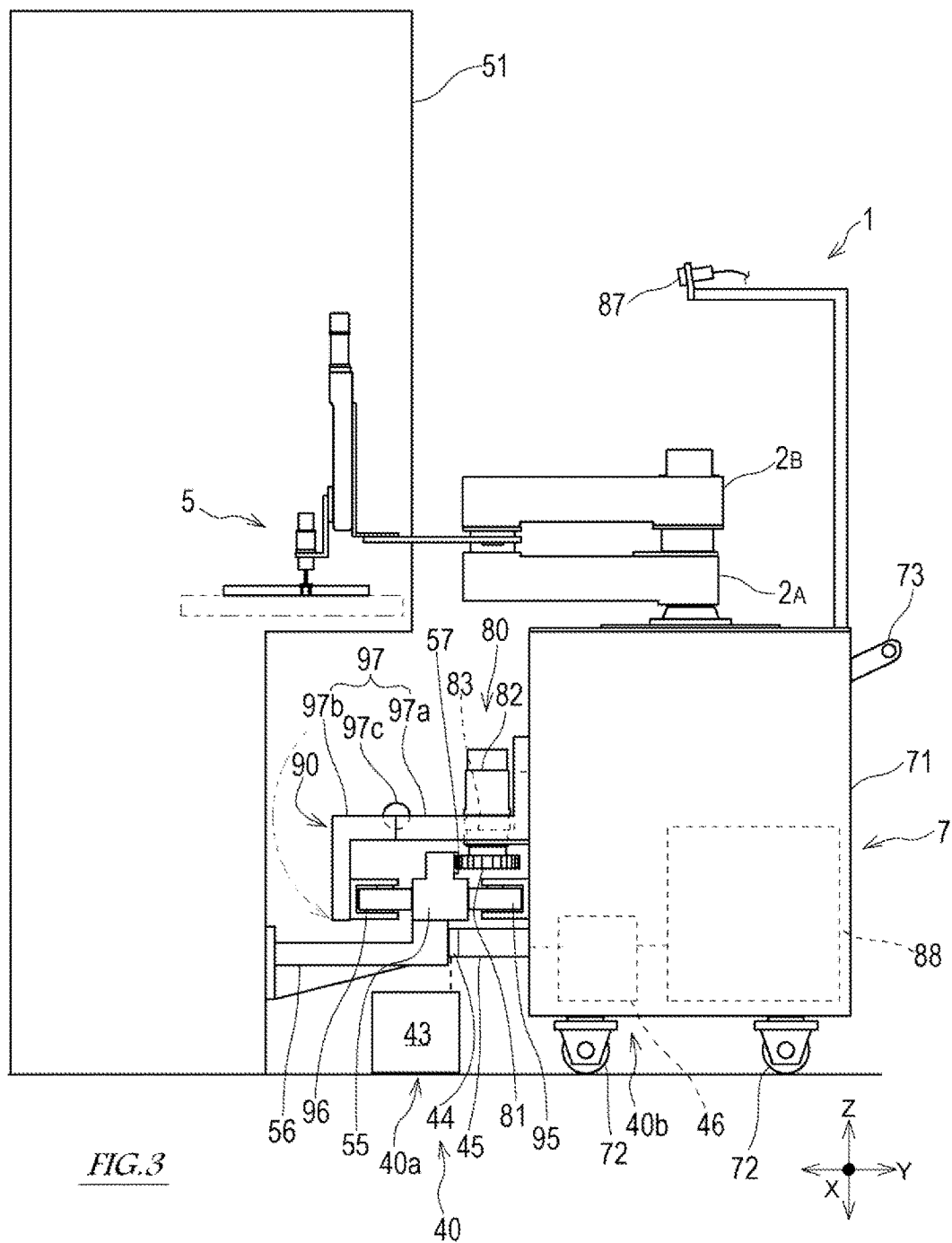
FIG. 3 is a side view schematically illustrating the structure of the rail and the self-traveling articulated robot engaged with the rail, of the production system illustrated in FIG. 1.

First, a production system 100 according to Embodiment 1 of the present invention is described. FIG. 1 is a plan view of the production system 100 according to Embodiment 1 of the present invention, FIG. 2 is a side view schematically illustrating a structure of a rail 55 and a self-traveling articulated robot 1 of the production system 100 illustrated in FIG. 1, and FIG. 3 is a side view schematically illustrating the structure of the rail 55 and the self-traveling articulated robot 1 engaged with the rail 55, of the production system 100 illustrated in FIG. 1. As illustrated in FIGS. 1 to 3, the production system 100 according to this embodiment is provided with the rail 55, and at least one or more self-traveling articulated robots which is self-travelable along the rail 55 (hereinafter, may simply be referred to as "the robot 1").

The production system 100 according to this embodiment is further provided with a plurality of processing units 51 disposed along the rail 55, and a plurality of auxiliary workbenches 52 disposed along the rail 55 and at the opposite side of the plurality of processing units 51 with respect to the rail 55. Each of the plurality of processing units 51 is provided with brackets 56 projecting toward the rail 55 and, thus the rail 55 is supported by the brackets 56 so as to extend substantially horizontally. Below, for convenience, the extending direction of the rail 55 is referred to as X-direction, a horizontal direction which intersects perpendicularly to the X-direction is referred to as Y-direction, and the vertical direction is referred to as Z-direction.

The plurality of auxiliary workbenches 52 are arranged in line in the X-direction, and a part between the adjacent auxiliary workbenches 52 in the X-direction serves as a work area WA of the robot 1.

A rack 57 is provided above the rail 55 so as to extend along the rail 55 in parallel to the X-direction which is the extending direction of the rail 55. The rack 57 according to this embodiment is provided throughout the rail 55. Note that the rack 57 may be partially provided only in the work area WA and its perimeter with respect to the rail 55. Moreover, the rack 57 according to this embodiment is integrally provided to the rail 55. Note that the rack 57 may be provided to the rail 55 by coupling a rack member in which the rack 57 is formed to the rail 55.

Moreover, a power-transmitting member 44 extending along the rail 55 in parallel to the X-direction which is the extending direction of the rail 55 is provided to the rail 55. The power-transmitting member 44 according to this embodiment is provided throughout the rail 55. Note that the power-transmitting member 44 may be partially formed only in the work area WA and its perimeter of the rail 55. A power transmission coil (not illustrated) is provided inside the power-transmitting member 44. This power transmission coil constitutes, along with a power-transmitting-side controller 43 which supplies current to the power transmission coil, a power-transmitting-side (primary side) module 40a of a contactless power transmission system 40. The power-transmitting-side controller 43 is connected with the commercial power supply through an AC adaptor.

Figure 4:
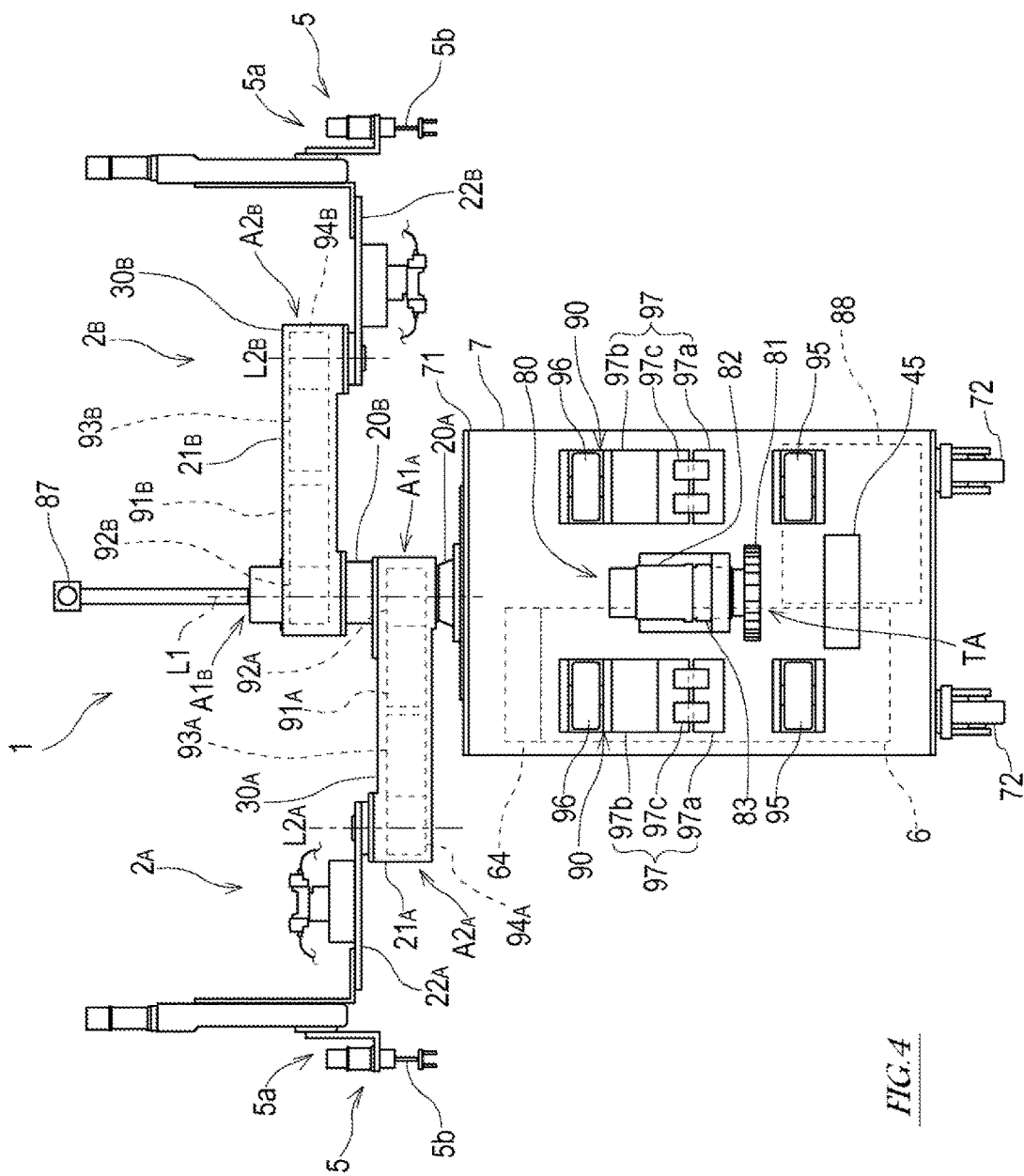
FIG. 4 is a front view schematically illustrating the structure of the self-traveling articulated robot.
Figure 5:
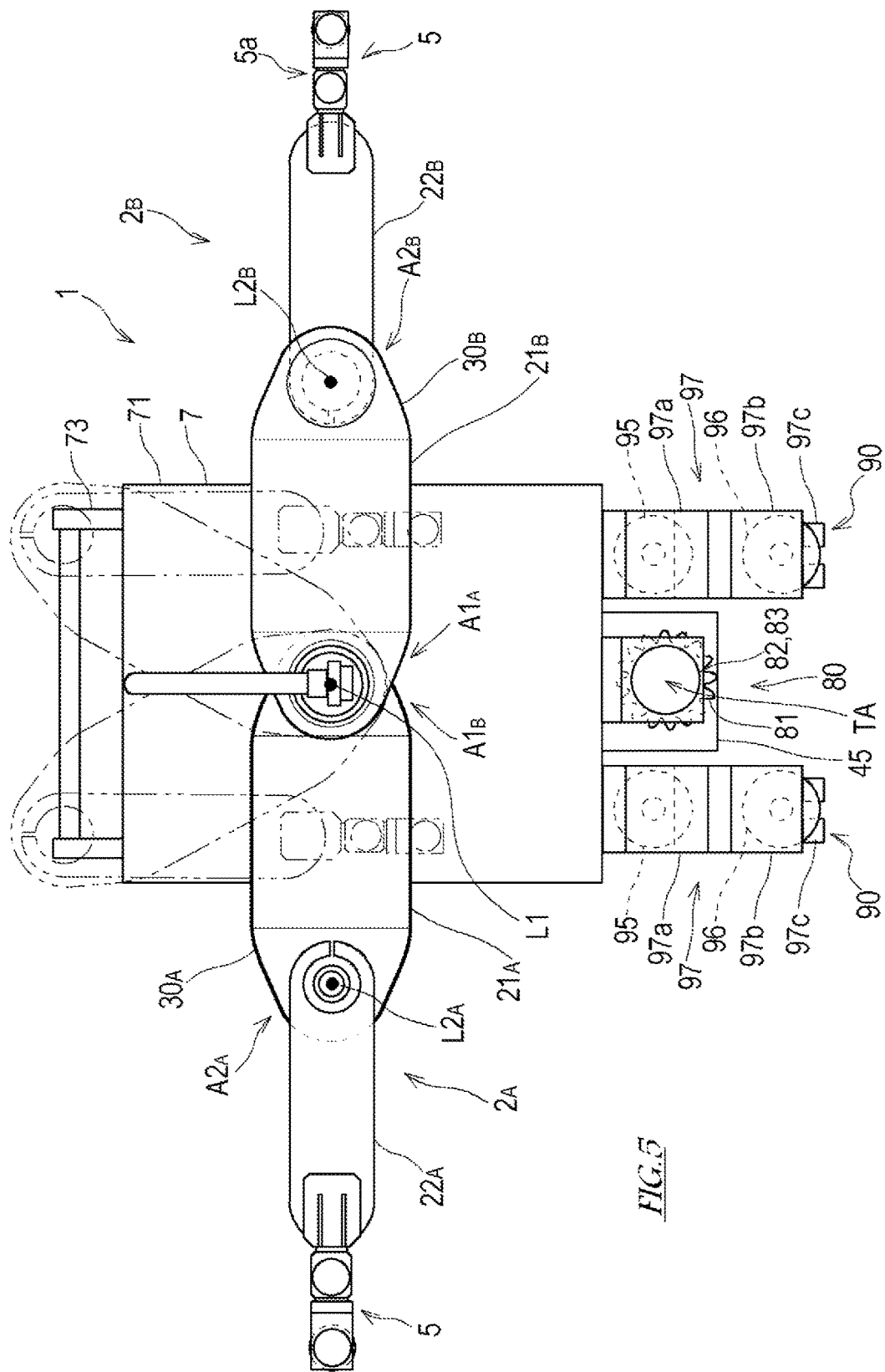
FIG. 5 is a plan view schematically illustrating the structure of the self-traveling articulated robot.

Here, the structure of the robot 1 is described. FIG. 4 is a front view schematically illustrating the structure of the self-traveling articulated robot 1, and FIG. 5 is a plan view schematically illustrating the structure of the self-traveling articulated robot 1. As illustrated in FIGS. 2 to 5, the robot 1 includes a carriage 7 which is self-travelable along the rail 55, sliders 90 which releasably engage with the rail 55, at least one robotic arm ($2_A$ and $2_B$) supported by the carriage 7, an end effector 5 detachably attached to a tip-end of each of the robotic arms $2_A$ and $2_B$, an image-processing unit 64, and a control unit 6 which controls operation of the robotic arms $2_A$ and $2_B$ and the carriage 7. Operation of the end effectors 5 may also be controlled by the control unit 6.

The robot 1 according to this embodiment is a dual-arm robot having the left and right robotic arms $2_A$ and $2_B$. The left and right robotic arms $2_A$ and $2_B$ are operable independently, or operable mutually related to each other. Thus, the left and right robotic arms $2_A$ and $2_B$ are performable of different works, or are performable of a single work by a collaboration of both. Note that the robot 1 according to the present invention is not limited to the dual-arm robot, but may be provided with at least one robotic arm.

One of the robotic arms ($2_A$) is provided with a first link $21_A$ which rotates on a first axis L1, and a second link $22_A$ coupled to the first link $21_A$ so as to be rotatable on a second axis $L2_A$ defined at a tip-end of the first link $21_A$. Similarly, the other robotic arm $2_B$ is provided with a first link $21_B$ which rotates on the first axis L1, and a second link $22_B$ coupled to the first link $21_B$ so as to be rotatable on a second axis $L2_B$ defined at a tip-end of the first link $21_B$. The first axis L1 is parallel to the second axes $L2_A$ and $L2_B$, and the first axis L1 and the second axes $L2_A$ and $L2_B$ according to this embodiment extend vertically.

The first axis L1 of the first links $21_A$ and $21_B$ of the two robotic arms $2_A$ and $2_B$ are coaxial, and the first link $21_A$ of one robotic arm $2_A$ and the first link $21_B$ of the other robotic arm $2_B$ are arranged with a height difference in the vertical directions. Below, one of the two robotic arms $2_A$ and $2_B$ of which the first link $21_A$ is located below the other is referred to as "the first arm $2_A$," and the other is referred to as "the second arm $2_B$."

Here, the structure of the first arm $2_A$ is described in detail. The first link $21_A$ of the first arm $2_A$ is rotatably supported via bearing(s) (not illustrated) by a base shaft $20_A$ fixed to an upper surface of the carriage 7. The second link $22_A$ of the first arm $2_A$ is rotatably supported via bearing(s) (not illustrated) at the tip-end of the first link $21_A$.

The contour of the first link $21_A$ is formed by a hollow link member $30_A$. A servomotor $91_A$ and a power transmission device $92_A$ for driving the first link $21_A$ to rotate on the first axis L1 are provided inside the link member $30_A$. The power transmission device $92_A$ also has a function as a gear-reduction mechanism for adjusting rotational torque. Thus, the first arm $2_A$ has an operating shaft (a first shaft $A1_A$) which is driven by the servomotor $91_A$ and constitutes a joint coupling the first link $21_A$ to the base shaft $20_A$.

Moreover, a servomotor $93_A$ and a power transmission device $94_A$ for driving the second link $22_A$ to rotate on the second axis $L2_A$ are provided inside the link member $30_A$. The power transmission device $94_A$ also has a function as a gear-reduction mechanism for adjusting rotational torque. Thus, the first arm $2_A$ has an operating shaft (a second shaft $A2_A$) which is driven by the servomotor $93_A$ and constitutes a joint coupling the second link $22_A$ to the first link $21_A$.

Subsequently, the second arm $2_B$ is described in detail. A base shaft $20_B$ of the second arm $2_B$ is fixed onto the first link $21_A$ of the first arm $2_A$. The second arm $2_B$ has a structure similar to the first arm $2_A$ described above. Thus, in each drawing, each component of the first arm $2_A$ is assigned with a reference character accompanying "A" of the alphabet after the numeral, and each component of the second arm $2_B$ is assigned with a reference character accompanying "B" of the alphabet after the numeral. The components of which the numeral part of the reference character is common are common components of the first arm $2_A$ and the second arm $2_B$ and, thus, the functions and shapes are the same or similar. Thus, detailed description of the structure of the second arm $2_B$ is omitted by reading "A" of the alphabet accompanied by the reference character in the description of the first arm $2_A$ described above as "B" of the alphabet.

Next, the carriage 7 is described. The carriage 7 includes a box-shaped casing 71, a plurality of swivel casters 72 provided to a lower part of the casing 71, a handle 73 provided to a rear surface of the casing 71, a traveling drive unit 80, and a power-receiving member 45. In the robot 1 according to this embodiment, the sliders 90 are provided to the carriage 7. The casing 71 of the carriage 7 is hollow, and inside of which the control unit 6, a rechargeable battery 88 which supplies electric power to the control unit 6, a power-receiving-side controller 46, the image-processing unit 64, an air pressure feeding unit (not illustrated), etc. are disposed. Moreover, at least one camera 87, such as a machine vision camera, is provided to an upper part of the casing 71.

The traveling drive unit 80 includes a pinion gear 81 which can mesh with the rack 57 provided to the rail 55, a servomotor 82 which is a driving source, and a gear-reduction mechanism 83 provided onto a power transmission path from the servomotor 82 to the pinion gear 81. In the traveling drive unit 80 of this structure, output of the servomotor 82 is transmitted to the pinion gear 81 after being adjusted by the gear-reduction mechanism 83. The traveling drive unit 80 is an external shaft device of the robotic arms $2_A$ and $2_B$, and the servomotor 82 is controlled by the control unit 6. Thus, the carriage 7 has an operating shaft (a traveling shaft TA) driven by the servomotor 82.

The slider 90 includes a roller 95 rotatably supported by the casing 71, and a roller 96 rotatably supported by the casing 71 through an arm 97. The arm 97 is divided into a base-end portion 97a and a tip-end portion 97b, and the base-end portion 97a is rotatably coupled to the tip-end portion 97b via a hinge 97c. The base-end portion 97a of the arm 97 is fixed to the casing 71. The tip-end portion 97b of the arm 97 rotatably supports the roller 96.

The two sliders 90 having the structure described above are provided to the carriage 7 according to this embodiment, and these sliders 90 are disposed in a front surface of the casing 71 at both sides of the traveling drive unit 80. The slider 90 projects from the front surface of the casing 71 of the carriage 7, and projects toward the rail 55 from the carriage 7 while the robot 1 is working in the work area WA.

The power-receiving member 45 is provided to the front surface of the casing 71, at a height position corresponding to the power-transmitting member 44 provided to the rail 55. A power-receiving coil (not illustrated) is provided inside the power-receiving member 45. This power-receiving coil constitutes, along with the power-receiving-side controller 46 to which induced current generated by the power-receiving coil is supplied, a power-receiving-side (secondary side) module 40b of the contactless power transmission system 40. The power-receiving-side controller 46 is connected with the rechargeable battery 88 via a control IC, and electric power is supplied to the rechargeable battery 88 from the power-receiving-side controller 46.

Figure 6:
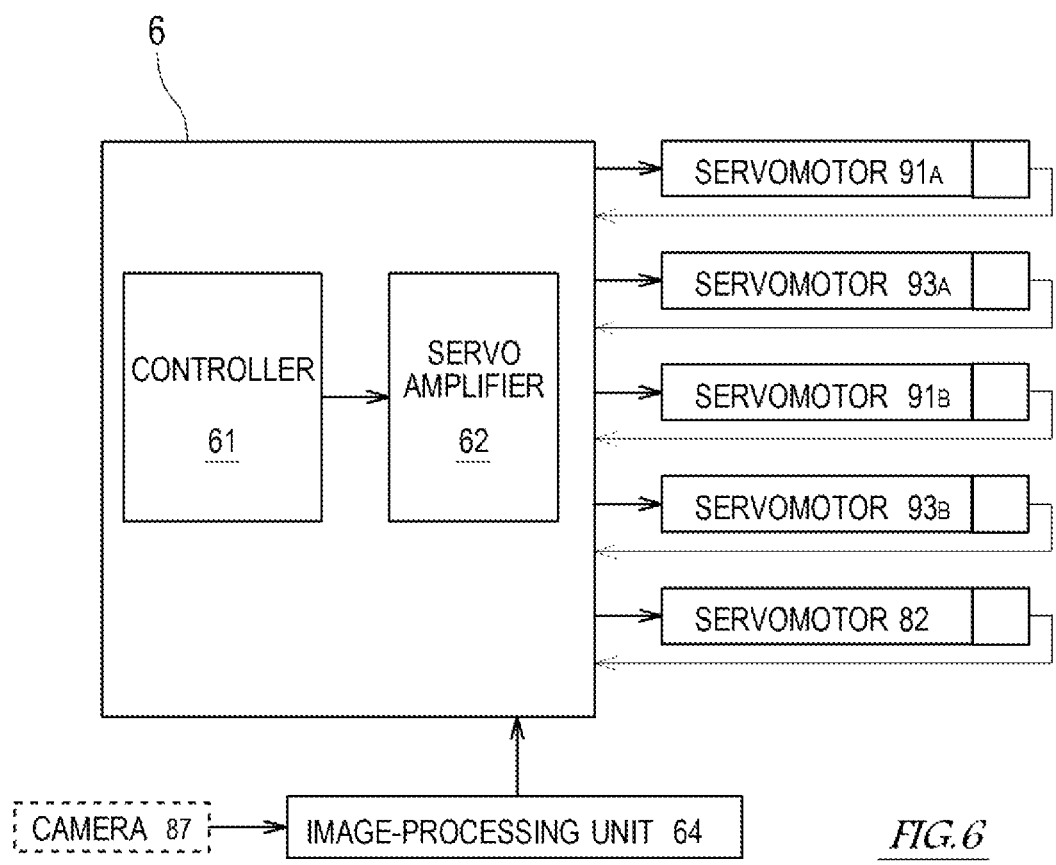
FIG. 6 is a block diagram schematically illustrating a configuration of a control system of the self-traveling articulated robot.

Subsequently, the control unit 6 is described. FIG. 6 is a block diagram schematically illustrating a structure of a control system of the self-traveling articulated robot 1. As illustrated in FIG. 6, the control unit 6 is provided with a controller 61 and a servo amplifier 62. The control unit 6 is connected to the image-processing unit 64.

The servo amplifier 62 is configured to supply drive current to the servomotors $91_A$ and $93_A$ which operate the operating shafts (i.e., the first shaft $A1_A$ and the second shaft $A2_A$) of the first arm $2_A$, the servomotors $91_B$ and $93_B$ which operate the operating shafts (i.e., the first shaft $A1_B$ and the second shaft $A2_B$) of the second arm $2_B$, and the servomotor 82 which operates the operating shaft (i.e., the traveling shaft TA) of the carriage 7, based on control signals (positional instructions) supplied from the controller 61. Note that the servo amplifier 62 is provided corresponding to each of the servomotors $91_A$, $93_A$, $91_B$, $93_B$, and 82, and they are illustrated comprehensively.

Each of the servomotors $91_A$, $93_A$, $91_B$, $93_B$, and 82 is provided with, for example, a rotation detector, such as a rotary encoder, which detects an amount of rotation, a rotational angle, a rotational position, etc. of the output shaft, and at least the rotational position of the output shaft of the servomotor detected by the rotation detector is inputted into the controller 61 and the servo amplifier 62.

The controller 61 is a so-called computer, and has an arithmetic processor such as a CPU, and a memory such as a ROM and/or a RAM (none of them is illustrated). The memory stores program(s) to be executed by the arithmetic processor, various fixed data, etc. The arithmetic processor performs data transmission and reception with external devices. The arithmetic processor also inputs detection signals from various sensors and outputs a control signal to each device to be controlled. In the controller 61, the arithmetic processor reads and executes software, such as the program(s), stored in the memory to perform processing(s) for controlling operation of the robot 1. Note that the controller 61 may perform each processing by a centralized control with a single computer, or may perform each processing by a distributed control with a collaboration of a plurality of computers. Moreover, the controller 61 may be comprised of a micro controller, a programmable logic controller (PLC), etc.

Subsequently, the image-processing unit 64 is described. The image-processing unit 64 is a device to detect a relative spatial relationship between a marker described later and the robot 1 (or the carriage 7) using an image which is imaged by the camera 87. The relative spatial relationship between the marker detected by the image-processing unit 64 and the robot 1 is transmitted to the control unit 6. The image-processing unit 64 is comprised of, for example, an arithmetic processor which carries out image processing of an image signal sent from the camera 87, and detects the relative spatial relationship between the marker and the robot 1, based on calculated feature quantities (an area, a center of gravity, a length, a position, etc.) of the marker.

In the robot 1 having the structure described above, the control unit 6 acquires the detection signals or measurement signals from the image-processing unit 64 and the rotation detectors provided to the respective servomotors $91_A$, $93_A$, $91_B$, $93_B$, and 82, and calculates current positions of control points defined in a hand or the end effector 5 of each of the robotic arms $2_A$ and $2_B$. The control unit 6 then generates the control signals so that the control points move to target positions along given routes in accordance with the given program(s). The control signals are outputted to the servo amplifier 62 from the controller 61. The servo amplifier 62 supplies the drive current according to the control signals to the servomotors $91_A$, $93_A$, $91_B$, $93_B$, and 82, respectively. Thus, the control unit 6 performs an automated control (i.e., a servo control), also for the operating shaft of the carriage 7 similar to the operating shafts of the robotic arms $2_A$ and $2_B$, in which positions, directions, postures, etc. of the control points are used as controlled variables to follow target values thereof.

Subsequently, the end effector 5 is described. As for the end effector 5, one having a structure suitable for work to be performed by the robot 1 is used. Here, one example of the end effector 5 is therefore described briefly. The end effector 5 according to this embodiment is generally comprised of a wrist part 5a and a tool part 5b provided to a tip-end of the wrist part 5a. The wrist part 5a has an elevatable operating shaft which vertically moves the tool part 5b, and a swivelable operating shaft which swivels the tool part 5b on a vertical axis. The elevatable operating shaft of the wrist part 5a is implemented, for example, by a linear motion mechanism comprised of a rail and a slider, and a servomotor which operates the slider. Moreover, the swivelable operating shaft of the wrist part 5a is implemented, for example, by a servomotor of which an output shaft is coupled to the tool part 5b.

Here, one example of the work performed by the production system 100 of the above structure is described. The robot 1 is positioned within the work area WA prior to a start of the work.

The robot 1 is carried by a worker into the work area WA. As illustrated in FIGS. 1 to 3, the robot 1 carried into the work area WA is brought close to the rail 55 in the Y-direction until the rollers 95 contact a side face of the rail 55 and the pinion gear 81 meshes with the rack 57. Here, the power-receiving member 45 of the power transmission system 40 is fully close to or contacts the power-transmitting member 44 to the extent that the power-receiving member 45 can receive the electric power from the power-transmitting member 44.

In the state where the robot 1 is brought close to the rail 55 as described above, the slider 90 engages with the rail 55. Here, the rollers 96 are first brought in contact with the side face of the rail 55 by rotating the tip-end portions 97b of the arms 97 downwardly centering on the hinges 97c. Then, the rotation of the tip-end portions 97b of the arms 97 is regulated by lock mechanisms (not illustrated). Thus, by rotating the arm 97 downwardly with respect to the carriage 7, the rail 55 is pinched between circumferential surfaces of the two rollers 95 and 96 of the slider 90 to be in a state where the slider 90 engages with the rail 55. Note that, by rotating the arm 97 upwardly with respect to the carriage 7, it becomes in a state where the slider 90 is disengaged from the rail 55. Thus, the slider 90 is engageable with and disengageable from the slider 90, and is switchable between the state where the slider 90 engages with the rail 55 and the state where the engagement is released.

As described above, when the slider 90 engages with the rail 55, the robot 1 is regulated in the movement in the Y-direction to the rail 55 and, thus, the robot 1 is positioned in the Y-direction. Next, the robot 1 performs positioning in the X-direction and positional calibration in the Z-direction.

The marker and the image-processing unit 64 are utilized for the positioning of the robot 1 in the X-direction and the positional calibration in the Z-direction. The marker is provided to the rail 55 in the work area WA, the processing unit 51, or their perimeters. For example, the marker of a particular shape may be provided to the surface of the processing unit 51 opposing to the robot 1, a particular shape of the opposing surface of the processing unit 51 to the robot 1 (e.g., a contour shape of a door etc.) may be used as the marker, or the marker of a particular shape may be provided to the rail 55. The control unit 6 acquires a relative spatial relationship between the marker and the robot 1 from the image-processing unit 64, and obtains a current position of the robot 1 based on the acquired relative spatial relationship.

The control unit 6 controls the operating shaft of the carriage 7 so that the current position of the robot 1 in the X-direction reaches a given work reference position which is the target position. When the control unit 6 controls the operating shaft of the carriage 7, if the servomotor 82 operates, the pinion gear 81 which meshes with the rack 57 rotates, and, as a result, the robot 1 moves in the X-direction along the rail 55.

Moreover, the control unit 6 calculates a Z-direction positional offset between the current position of the robot 1 in the Z-direction and the given work reference position, and calibrates a coordinate system or a target position of the robot 1 based on the Z-direction positional offset. Note that, if the robot 1 is provided with an elevatable operating shaft, the elevatable operating shaft may be controlled so that the current position of the robot 1 in the Z-direction reaches the given work reference position, instead of the positional calibration in the Z-direction.

After positioning the robot 1 in the work area WA is performed as described above, the robot 1 starts working. In the production system 100 according to this embodiment, an assemble work in which the robot 1 stationed in the work area WA attaches components 59 to a workpiece W, a carry-in work in which the robot 1 carries the workpiece W to which the component 59 is attached into the processing unit 51, and a take-out work in which the robot 1 takes the workpiece W after being processed by the processing unit 51 out of the processing unit 51.

In the assemble work, the robot 1 moves the workpiece W placed on the auxiliary workbench 52 to a workbench, moves a component tray where the plurality of components 59 are accommodated from a component shelf placed on the auxiliary workbench 52 to the workbench, and attaches the plurality of components 59 to the workpiece W on the workbench. Here, a cleared surface of the carriage 7 of the robot 1 is utilized as the workbench.

In the carry-in work, the robot 1 holds the workpiece W placed on the workbench, and places the workpiece W in a processing shelf inside the processing unit 51. In the take-out work, the robot 1 takes the workpiece W out of the processing shelf of the processing unit 51 to the outside of the processing unit 51, and places onto the auxiliary workbench 52. An automated door (not illustrated) is provided in an opening part of the processing unit 51. This automated door is opened when the robot 1 carries the workpiece W into the processing unit 51. Note that the automated door is opened while an object (a robotic arm, a workpiece, etc.) is detected by a moving-object and/or stationary-object detection sensor provided to the perimeter of the opening part.

Moreover, the automated door may be opened and closed when the robot 1 operates a touch switch.

The control unit 6 of the robot 1 controls the operating shafts of the robotic arms 2$_A$ and 2$_B$ and the operating shaft of the carriage 7 during the work so that the control point defined in the robotic arm 2$_A$ or 2$_B$ or the end effector 5 reaches the target position by a collaboration of the operating shafts of the robotic arms 2$_A$ and 2$_B$ and the operating shaft of the carriage 7 in accordance with the given program(s). That is, the control unit 6 performs the servo control in which the robotic arms 2$_A$ and 2$_B$ and the carriage 7 follow the target values of the controlled variables, such as the position, the direction, the posture, etc. of the particular control points, such as the tip position of the end effector 5.

Thus, the robot 1 works by the robotic arms 2$_A$ and 2$_B$, while moving the carriage 7 which is the pedestal of the robotic arms 2$_A$ and 2$_B$. Therefore, it is also possible for the control points of the robot 1 to reach the target positions outside a movable range of the robotic arms 2$_A$ and 2$_B$ and, thus, a work range of the robot 1 expands. In addition, since the operating shaft of the carriage 7 is also servo-controlled by the control unit 6, the control point is movable to the target position with high precision. Note that, although the robot 1 moves in the X-direction, since the power-transmitting member 44 is a member extending in the X-direction, the power supply to the robot 1 by the power transmission system 40 continues.

As described above, the production system 100 of this embodiment includes the rail 55 extending horizontally, and the self-traveling articulated robot 1 which is self-travelable along the rail 55 in parallel to the extending direction (the X-direction) of the rail 55. The production system 100 according to this embodiment is provided with the processing unit 51 of at least one workpiece located along the rail 55, and the work performed by the robot 1 includes works, such as carrying the workpiece into the processing unit 51, and taking the workpiece out of the processing unit 51.

The production system 100 according to this embodiment is characterized by including the carriage 7 having at least one operating shaft (the traveling shaft TA) driven by the servomotor 82 for the robot 1 self-traveling along the rail 55; the sliders 90 which project toward the rail 55 from the carriage 7 and releasably engage with the rail 55; the robotic arms 2$_A$ and 2$_B$ supported by the carriage 7, and having at least one operating shaft (the first shaft A1$_A$ and/or the second shaft A2$_A$, and the first shaft A1$_B$ and/or the second shaft A2$_B$) which are driven by the servomotors (91$_A$ and/or 93$_A$, and 91$_B$ and/or 93$_B$) and constitute the joints; the end effectors 5 provided to the tip-ends of the robotic arms 2$_A$ and 2$_B$; and the control unit 6 which is provided inside the carriage 7 and controls the operating shafts of the robotic arms 2$_A$ and 2$_B$ and the operating shaft of the carriage 7 so that the control points defined in the robotic arms 2$_A$ and 2$_B$ or the end effectors 5 reach the target positions by a collaboration of the operating shafts of the robotic arms 2$_A$ and 2$_B$ and the operating shaft of the carriage 7.

Thus, in the robot 1 according to this embodiment, the work is performed by the collaboration of the robotic arms 2$_A$ and 2$_B$ and the carriage 7 when the robot 1 works. That is, the robotic arms 2$_A$ and 2$_B$ are workable, while moving the carriage 7 which is the pedestal of the robotic arms 2$_A$ and 2$_B$. Therefore, it is also possible for the control points of the robot 1 to reach the target positions outside the movable range of the robotic arms 2$_A$ and 2$_B$ and, thus, the work range of the robot 1 expands. In addition, since the operating shaft of the carriage 7 is also servo-controlled by the control unit 6, the control point can be moved to the target position with high precision.

Moreover, by the sliders 90 of the robot 1 run on the rail 55, the relative location of the robot 1 in the Y-direction with respect to the rail 55 is held unchanged when the robot 1 moves in the X-direction along the rail 55. Moreover, when vibration, a reaction force, etc. is applied to the robot 1, the relative location of the robot 1 in the Y-direction with respect to the rail 55 is also held unchanged. Therefore, the positional control of the robot 1 is simplified.

Furthermore, since the sliders 90 of the robot 1 are engageable with and disengageable from the rail 55, the robot 1 becomes possible to move freely with respect to the rail 55 if the engagement of the sliders 90 with the rail 55 is released. Therefore, it is easy to move the robot 1 to the outside of the work area WA, or to replace the robot 1 with another robot 1.

Moreover, in this embodiment, the slider 90 of the robot 1 includes the two rollers 95 and 96 which pinch the rail 55 in the direction (the Y-direction) perpendicular to the extending direction of the rail 55 (the X-direction), and the arm 97 which is rotatably supported by the carriage 7 and holds one of the two rollers (the roller 96). The robot 1 is configured to switchable, by rotating the arm 97 with respect to the carriage 7, between the state where the slider 90 pinches the rail 55 with the circumferential surfaces of the two rollers 95 and 96 and engages with the rail 55, and the state where the engagement of the slider 90 with the rail 55 is released.

Thus, by rotating the arms 97, the sliders 90 engage with the rail 55, and the engagement is released. Thus, the engagement/disengagement operation of the sliders 90 with/from the rail 55 is simple.

Moreover, the production system 100 according to Embodiment further includes the power transmission system 40 having the power-transmitting-side module 40a connected to the power source, and the power-receiving-side module 40b which is mounted to the robot 1, receives electric power from the power-transmitting-side module 40a, and supplies the power to the robot 1. The power-transmitting-side module 40a includes the power-transmitting member 44 extending along the rail 55 in parallel to the extending direction of the rail 55, and the power-receiving-side module 40b includes the power-receiving member 45 disposed so as to receive the power from the power-transmitting member 44, while the slider 90 engages with the rail 55.

According to the structure described above, while the sliders 90 of the robot 1 engage with the rail 55, the power is transmitted to the power-receiving-side module 40b from the power-transmitting-side module 40a, and the power is supplied to the robot 1 from the power-receiving-side module 40b. Note that, in this embodiment, it is configured so that the power is supplied to the rechargeable battery 88 from the power-receiving-side module 40b, and the power is supplied to the control unit 6 of the robot 1 from the rechargeable battery 88. Thus, even if the power supply from the power-transmitting-side module 40a to the power-receiving-side module 40b is unstable, the power is stably supplied to the robot 1.

Note that, in this embodiment, although the power-transmitting member 44 is attached to the rail 55, the power-transmitting member 44 is not limited to this structure. For example, the power-transmitting member 44 may be provided on a floor surface where the robot 1 travels, as a separate member from the rail 55. Moreover, although the contactless power transmission system 40 is adopted in this embodiment, the contactless power transmission system 40 may be a contact type. In the case of the contact-type power transmission system 40, for example, an elongated electrode extending along the rail 55 is usable as the power-transmitting member 44, and a roller-shaped or slider-shaped electrode which rolls or slides on the surface of the power-transmitting member 44 is usable as the power-receiving member 45.

Moreover, the production system 100 according to this embodiment includes the rack 57 extending along the rail 55 in parallel to the extending direction of the rail 55 so that the rack 57 meshes with the pinion gear 81 while the sliders 90 engage with the rail 55. The pinion gear 81 is driven by the operating shaft (the traveling shaft TA) of the carriage 7.

According to the structure described above, when the operating shaft of the carriage 7 operates, the pinion gear 81 which meshes with the rack 57 rotates, and, as a result, the carriage 7 moves in the X-direction. Note that, although the rack 57 is integrally provided to the rail 55 in this embodiment, the rack 57 is not limited to this structure. For example, the rack 57 may be provided on the floor surface where the robot 1 travels, as a separate member from the rail 55.

Embodiment 2

Figure 7:
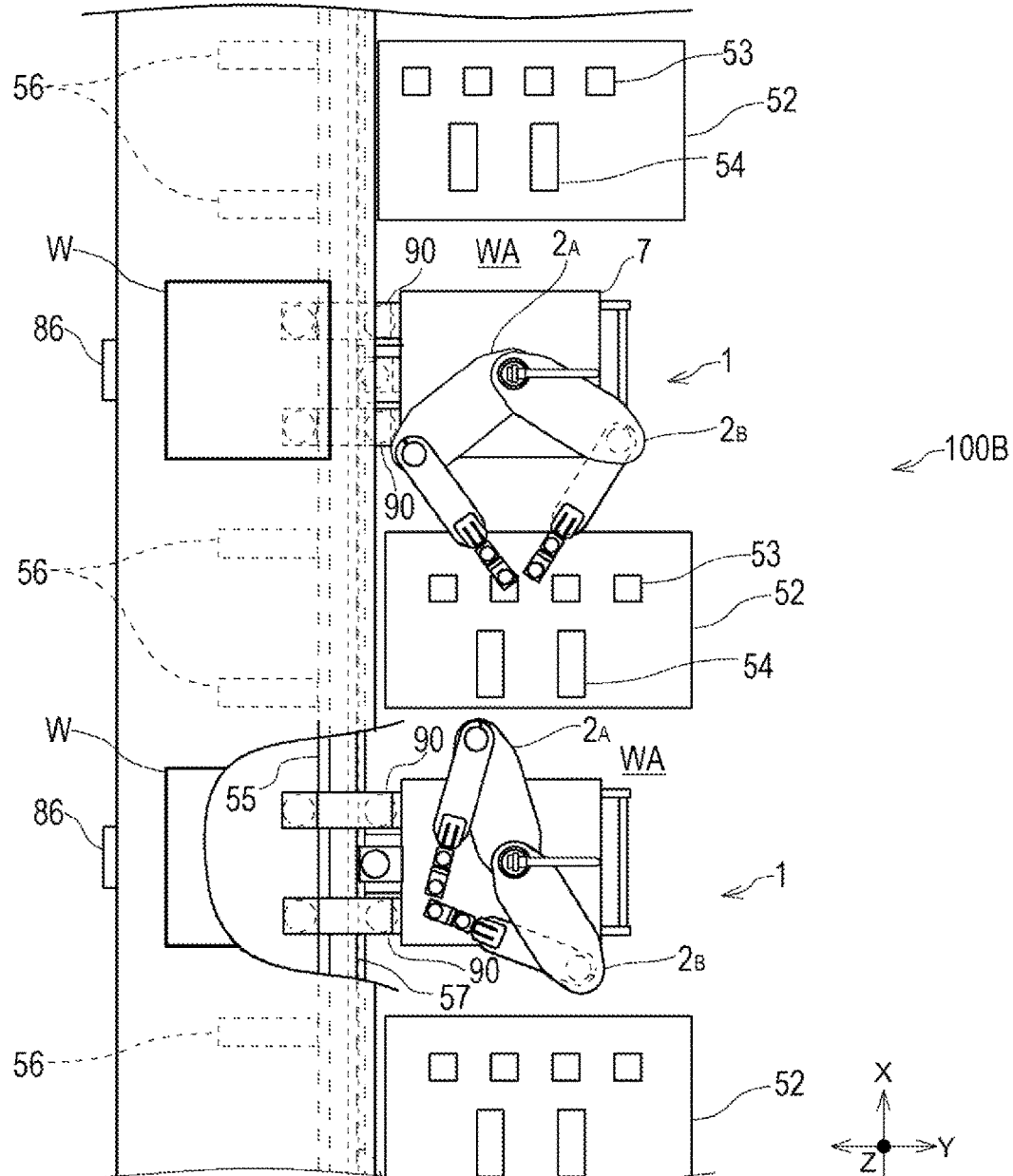
FIG. 7 is a plan view of a production system according to Embodiment 2 of the present invention.
Figure 8:
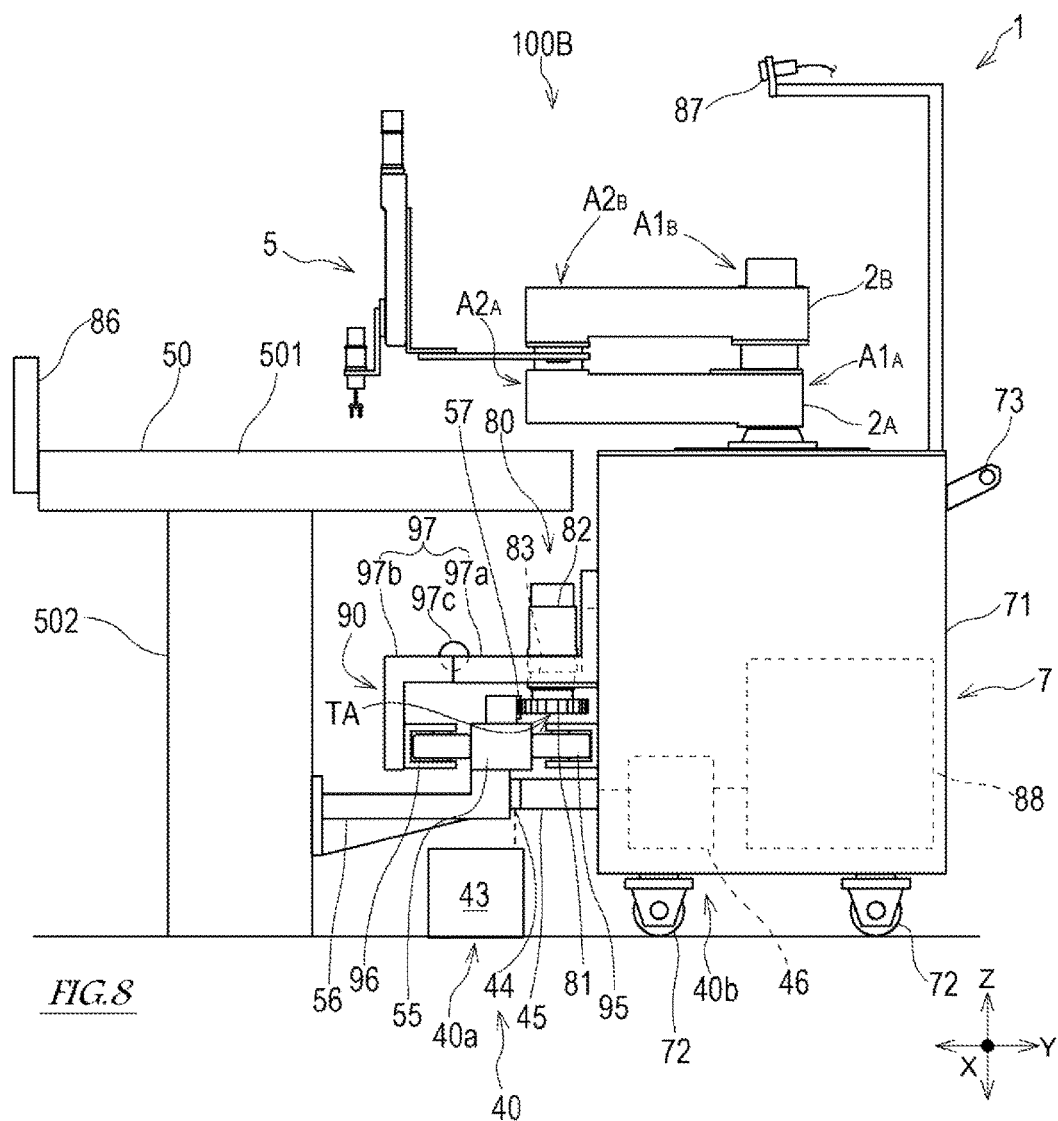
FIG. 8 is a side view schematically illustrating a structure of a rail and a self-traveling articulated robot of a production system illustrated in FIG. 7.

Next, a production system 100B according to Embodiment 2 of the present invention is described. The production system 100B according to this embodiment is a system for producing products or components by means of line production. FIG. 7 is a plan view of the production system 100B according to Embodiment 2 of the present invention, and FIG. 8 is a side view schematically illustrating a structure of a rail 55 and a self-traveling articulated robot 1 of the production system 100B illustrated in FIG. 7. Note that, in the description of this embodiment, members which are the same as or similar to those of Embodiment 1 described above are given with the same reference characters in the drawings and, thus, description thereof is omitted.

The production system 100B illustrated in FIGS. 7 and 8 includes a rail 55, and at least one or more self-traveling articulated robots (hereinafter, may simply be referred to as "the robot 1") which is self-travelable along the rail 55. Since the robot 1 has similar structures and functions to the robot 1 according to Embodiment 1 described above and, thus, detailed description of the robot 1 is omitted. Moreover, the rail 55 also has similar structures and functions to the rail 55 according to Embodiment 1 described above, and is provided with the rack 57 extending in the X-direction and the power-transmitting member 44 extending in the X-direction.

The production system 100B is provided with a line conveyance device 50 which conveys the workpieces W along the rail 55. This line conveyance device 50 is comprised of, for example, a belt conveyor 501 and its support base 502. An upper surface of the belt conveyor 501 is used as a workbench. The support base 502 is provided with a bracket 56 which projects toward the rail 55 and, thus, the rail 55 is supported by the bracket 56 so as to extend substantially horizontally in the X-direction.

The plurality of auxiliary workbenches 52 are provided along the rail 55. The plurality of auxiliary workbenches 52 are arranged in line in the X-direction, and a part between the adjacent auxiliary workbenches 52 in the X-direction serves as the work area WA of the robot 1. Components 53 and 54 to be assembled to the workpiece W are placed on the auxiliary workbench 52. Moreover, a marker 86 is provided in the work area WA or its neighborhood. Note that the marker 86 is provided at a location where the camera 87 is imageable when the robot 1 is within the work area WA.

Here, one example of work performed by the production system 100B of the above structure is described. The robot 1 is positioned within the work area WA prior to a start of the work.

The robot 1 is carried by a worker into the work area WA. The robot 1 carried into the work area WA is positioned in the X-direction and the Y-direction, and is further calibrated in the Z-direction, similar to Embodiment 1 described above. Since the robot 1 is not fixed to the line conveyance device 50, the robot 1 may be replaced with another robot 1, or the number of robots 1 may be changed, according to the type of the work. Moreover, when one of the plurality of robots 1 stationed along the line conveyance device 50 breaks down or is failed, the work can be resumed with a short downtime after the single failed robot 1 is replaced.

After positioning the robot 1 in the work area WA is performed as described above, the robot 1 starts working. The control unit 6 in a work mode calculates the current positions of the control points based on the rotational position of each of the servomotors $91_A$, $93_A$, $91_B$, $93_B$, and 82 mounted to the robot 1. The control unit 6 controls each of the operating shafts of the robotic arms $2_A$ and $2_B$ and the operating shaft of the carriage 7 so that the current positions of the control points reach the target positions passing through the routes stored beforehand.

For example, an assembling component 53 at a near side placed on the auxiliary workbench 52 is located within the movable range of the robotic arms $2_A$ and $2_B$. When taking the assembling component 53 out of the auxiliary workbench 52, the control unit 6 controls the operating shafts of the robotic arms $2_A$ and $2_B$ and the carriage 7 so that the control points reach positions from which an assembling component 54 can be taken out by operating the robotic arms $2_A$ and $2_B$. Here, although the carriage 7 does not substantially move, the operating shaft of the carriage 7 is controlled so that the carriage 7 maintains its position in the X-direction.

Note that, in order for the carriage 7 to maintain the position in the X-direction, a relative spatial relationship between the marker 86 detected by the image-processing unit 64 and the robot 1 (or the carriage 7) may be used. For example, the control unit 6 calculates a positional error (positional offset) of the current position with respect to a given work reference position based on the relative spatial relationship of the detected marker 86 and the robot 1, and controls the operating shaft of the carriage 7 so that the positional error is eliminated.

Moreover, for example, the assembling component 54 at a deeper side placed on the auxiliary workbench 52 is located outside the movable range of the robotic arms $2_A$ and $2_B$. When taking the assembling component 54 out of the auxiliary workbench 52, the control unit 6 controls the operating shafts of the robotic arms $2_A$ and $2_B$ and the carriage 7 so that the control points reach positions from which the assembling component 54 is taken out by moving the carriage 7 in the X-direction and operating the robotic arms $2_A$ and $2_B$. Thus, by the robotic arms $2_A$ and $2_B$ and the carriage 7 collaborating, the control points of the robot 1 are movable also to the target positions located outside the movable range of the robotic arms $2_A$ and $2_B$ when the robot 1 is at the work reference position.

As described above, the production system 100B according to this embodiment includes the line conveyance device 50 which conveys the workpiece along the rail 55 in parallel to the extending direction of the rail 55, and the rail 55 is supported by the line conveyance device 50. The robot 1 is configured so as to perform the work for the incoming workpiece W which is conveyed by the line conveyance device 50. Thus, the production system according to the present invention is also applicable to the line production system.

Suitable embodiments of the present invention are described above. It is apparent for a person skilled in the art that many improvements and other embodiments of the present invention are possible. Therefore, the above description is to be interpreted only as illustration, and is provided in order to teach a person skilled in the art the best mode which implements the present invention. Details of the structures and/or functions may substantially be changed, without departing from the spirit of the present invention.

DESCRIPTION OF REFERENCE CHARACTERS

1: Self-traveling Articulated Robot
$2_A$, $2_B$: Robotic Arm
5: End Effector
6: Control Unit
7: Carriage
$20_A$, $20_B$: Base Shaft
$21_A$, $21_B$: First Link
$22_A$, $22_B$: Second Link
$30_A$, $30_B$: Link Member
40: Power Transmission System
40a: Power-transmitting-side Module
40b: Power-receiving-side Module
43: Power-transmitting-side Controller
44: Power-transmitting Member
45: Power-receiving Member
46: Power-receiving-side Controller
50: Line Conveyance Device
51: Processing Unit
52: Auxiliary Workbench
55: Rail
56: Bracket
57: Rack
61: Controller
62: Servo Amplifier
64: Image-Processing Unit
71: Casing
72: Swivel Caster
73: Handle
80: Traveling Drive Unit
81: Pinion Gear
82: Servomotor
83: Gear-reduction Mechanism
87: Camera
88: Rechargeable Battery
90: Slider
95: Roller
96: Roller
97: Arm
100, 100B: Production System
$A1_A$, $A1_B$, $A2_A$, $A2_B$: Operating Shaft of Robotic Arm
L1: First Axis
$L2_A$, $L2_B$: Second Axis
TA: Operating Shaft of Carriage (Traveling Shaft)
W: Workpiece
WA: Work Area

What is claimed is:

1. A production system, comprising:
a rail extending horizontally; and
a self-traveling articulated robot that is self-travelable along the rail in parallel to an extending direction of the rail,
the self-traveling articulated robot including:
a carriage having at least one operating shaft configured to be driven by a servomotor and to self-travel along the rail;
a slider projecting toward the rail from the carriage and configured to releasably engage with the rail;
a robotic arm supported by the carriage and having at least one operating shaft that is driven by a servomotor and constitutes a joint;
an end effector provided to a tip-end of the robotic arm; and
a control unit provided inside the carriage and configured to control the operating shaft of the robotic arm and the operating shaft of the carriage so that a control point defined in the robotic arm or the end effector reaches a target position by a collaboration of the operating shaft of the robotic arm and the operating shaft of the carriage, wherein
the slider of the self-traveling articulated robot includes two rollers configured to pinch the rail in directions perpendicular to the extending direction of the rail, and an arm rotatably supported by the carriage and configured to hold one of the two rollers, and
the self-traveling articulated robot is configured to be switchable, by rotating the arm with respect to the carriage, between a state where the rail is pinched between the circumferential surfaces of the two rollers and the slider engages with the rail, and a state where the engagement of the slider with the rail is released.

2. The production system of claim 1, further comprising:
a line conveyance device configured to convey a workpiece along the rail in parallel to the extending direction of the rail, the rail being supported by the line conveyance device.

3. The production system of claim 1, further comprising:
a processing unit of at least one workpiece disposed along the rail, the rail being supported by the processing unit.

4. A production system, comprising:
a rail extending horizontally; and
a self-traveling articulated robot that is self-travelable along the rail in parallel to an extending direction of the rail,
the self-traveling articulated robot including:
a carriage having at least one operating shaft configured to be driven by a servomotor and to self-travel along the rail;
a slider projecting toward the rail from the carriage and configured to releasably engage with the rail;
a robotic arm supported by the carriage and having at least one operating shaft that is driven by a servomotor and constitutes a joint;
an end effector provided to a tip-end of the robotic arm; and
a control unit provided inside the carriage and configured to control the operating shaft of the robotic arm and the operating shaft of the carriage so that a control point defined in the robotic arm or the end effector reaches a target position by a collaboration of the operating shaft of the robotic arm and the operating shaft of the carriage, the production system further comprising:
  a power transmission system having a power-transmitting-side module connected to a power source; and
  a power-receiving-side module mounted to the self-traveling articulated robot, the power-receiving-side module receiving electric power from the power-transmitting-side module and supplying to the self-traveling articulated robot, wherein
  the power-transmitting-side module includes a power-transmitting member extending along the rail in parallel to the extending direction of the rail, and
  the power-receiving-side module includes a power-receiving member disposed so as to receive the power from the power-transmitting member while the slider engages with the rail.

5. A production system, comprising:
a rail extending horizontally; and
a self-traveling articulated robot that is self-travelable along the rail in parallel to an extending direction of the rail,
the self-traveling articulated robot including:
  a carriage having at least one operating shaft configured to be driven by a servomotor and to self-travel along the rail;
  a slider projecting toward the rail from the carriage and configured to releasably engage with the rail;
  a robotic arm supported by the carriage and having at least one operating shaft that is driven by a servomotor and constitutes a joint;
  an end effector provided to a tip-end of the robotic arm; and
  a control unit provided inside the carriage and configured to control the operating shaft of the robotic arm and the operating shaft of the carriage so that a control point defined in the robotic arm or the end effector reaches a target position by a collaboration of the operating shaft of the robotic arm and the operating shaft of the carriage,
the self-traveling articulated robot having a pinion gear driven by the operating shaft of the carriage, and
the production system further comprising:
  a rack extending along the rail in parallel to the extending direction of the rail and configured to mesh with the pinion gear while the slider engages with the rail.

* * * * *